United States Patent [19]

Rude et al.

[11] Patent Number: 5,058,720
[45] Date of Patent: Oct. 22, 1991

[54] METHODS FOR REDUCING LOST MOTION AND WIRE DISTORTION IN SPRING CLUTCHES

[75] Inventors: Edward T. Rude, Fairfield; Martin Waine, Riverside, both of Conn.

[73] Assignee: General Clutch Corporation, Stamford, Conn.

[21] Appl. No.: 496,990

[22] Filed: Mar. 21, 1990

[51] Int. Cl.⁵ .............................................. F16D 13/02
[52] U.S. Cl. ................................ 192/41 S; 192/81 C; 192/33 C; 192/8 C; 188/82.6
[58] Field of Search .............. 192/41 S, 81 C, 12 BA, 192/8 C, 33 C; 188/77 W, 82.6

[56] References Cited

U.S. PATENT DOCUMENTS

| | | | |
|---|---|---|---|
| 2,643,749 | 6/1953 | Greenlee | 192/41 S |
| 3,110,380 | 11/1963 | Meyer et al. | 192/41 S |
| 3,529,703 | 9/1970 | Kroeker | 192/41 S |
| 3,920,106 | 11/1975 | Nisenson | 192/41 S |
| 4,372,432 | 2/1983 | Waine et al. | 192/41 S |
| 4,427,100 | 1/1984 | Rude et al. | 192/41 S |
| 4,433,765 | 2/1984 | Rude et al. | 192/41 S |

*Primary Examiner*—Allan D. Herrmann
*Assistant Examiner*—Andrea Pitts
*Attorney, Agent, or Firm*—Gottlieb, Rackman & Reisman

[57] ABSTRACT

A spring clutch for limiting lost motion during release is provided. The spring clutch includes a shaft, a helically wound coaxially mounted spring for making frictional contact with the shaft, and means, such as a tang element, for selectively applying a loosing force to at least one end of the spring for rotation thereof with respect to the shaft. The inventive spring clutch further includes means for urging the spring toward the shaft when the spring is rotatably loosened. As a result, radial movement of the spring away from the shaft is substantially prevented. The urging means may be retained by a housing coaxially mounted about the shaft and may be chosen from a boss or an auxiliary spring. Preferably, the urging means is located at about 90 degrees along the outer radial surface of the shaft from the end of the spring at which the tang element is located. In another embodiment, a core is coaxially mounted within the shaft such that the spring is located between the shaft and the core and the urging means is retained by the core.

22 Claims, 4 Drawing Sheets

METHODS FOR REDUCING LOST MOTION AND WIRE DISTORTION IN SPRING CLUTCHES

This invention relates to spring clutches and more particularly to a method for limiting lost motion during release in normally engaged spring clutches.

BACKGROUND

Wrap spring clutches function by controllably expanding or contracting the spring with respect to one or more surfaces. For example, a wrap spring can serve as the engaging element in a normally engaged overrunning clutch in which the input drives the output for only one direction of rotation, while permitting slippage in the other direction so that the output can remain stationary while the input continues to rotate. Following a change in direction from the slipping to the driving direction of rotation, it is inevitable that some amount of input rotation will take place before the output begins to be driven. This motion is called lost motion. There are three specific major causes for lost motion in an overrunning wrap spring clutch. (1) Clearances between component parts of the clutch are required for practical manufacture and assembly. Careful design and quality control can minimize but never eliminate lost motion due to these clearances. (2) The coil diameter of the spring must change in order to engage or release, as the case may be, the mating surface. In order for the diameter to change, it is obviously necessary that there be relative movement between the ends of the spring. This requires some amount of lost motion between the input and the output elements of the device, but the movement required to accomplish this change in spring diameter is extremely small and is usually negligible compared to other components of lost motion. (3) A potentially large component of lost motion can occur when a force is applied to an end of the spring for the purpose of changing its diameter. A force, applied at an end of the clutch spring in the direction such as to loosen the spring, will usually distort the final turn of the spring so that it moves away from the mating surface. This movement is the component of lost motion that is addressed by our invention. The first two components of lost motion are not addressed by our invention but are mentioned here simply for clarity.

Every method for controlling the engagement of a wrap spring clutch must, by some means, impart a bending moment to the spring to cause a change in the spring's radius of curvature. In some clutches, the means employed for changing the size of the spring is simply to apply a force that either pushes or pulls, as is appropriate, on the end of the spring. The moment results from the combination of the applied force together with reaction forces from other elements in the clutch. This method is used because it is mechanically simple, but it does not produce the ideal effect on the spring. The ideal method would be to apply a bending moment, or force couple to the end of the spring. A pure bending moment would change the diameter without producing any distortion. Unfortunately, it is usually not convenient to apply a bending moment directly to the end of a clutch spring, so a simple force is usually employed and the resulting lost motion is tolerated as a matter of practical necessity. Our invention provides a means for significantly reducing that distortion and eliminating much of the lost motion produced by the distortion.

The element that applies the force to the end of the spring can be a stationary stop with which the spring comes into contact as it rotates. Or it can be a surface on a coaxially mounted element which can contact the end of the spring.

Distortion in the ends of wrap springs has been analyzed by A. M. Wahl in the *Journal of Applied Mechanics*, Vol. 62, 1940, pp. A89–A91. Wahl's analysis applies to wrap springs as they are used in split-core clutches. These are clutches in which the clutch spring is wrapped over the adjoining portion of two concentric axially abutting cylindrical surfaces. This configuration produces a clutch whose input can drive the output for one direction of rotation, and overrun in the other. However, the distortion referred to in the Wahl analysis is largely eliminated in clutches in which the ends of the spring have been reformed after winding. Therefore the distortion discussed by Wahl is not an important factor in the clutches herein considered.

Our invention provides a means for eliminating the lost motion due to distortion of the last turn of the spring.

SUMMARY OF THE INVENTION

Generally speaking, in accordance with the invention, a spring clutch for limiting lost motion during release is provided. The spring clutch includes a shaft, a helically wound coaxially mounted spring for making frictional contact with the shaft, and means, such as a tang element, for selectively applying a loosing force to at least one end of the spring for rotation thereof with respect to the shaft. The inventive spring clutch further includes means for urging the spring toward the shaft when the spring is rotatably loosened. As a result, radial movement of the spring away from the shaft is substantially prevented.

The urging means may be retained by a housing coaxially mounted about the shaft and may be chosen from a boss or an auxiliary spring.

Preferably, the urging means is located at about 90 degrees along the outer radial surface of the shaft from the end of the spring at which the tang element is located.

In another embodiment, a core is coaxially mounted within the shaft such that the spring is located between the shaft and the core and the urging means is retained by the core.

Accordingly, it is the object of the invention to provide an improved spring clutch assembly.

It is an object of our invention to provide a means for achieving lower lost motion in clutch springs.

It is a further object of our invention to provide a means for disengaging spring clutches that causes minimal distortion in the last half turn of the spring.

Still other objects and advantages of the inventive spring clutch will in part be obvious and will in part be apparent from the following specification.

The inventive spring clutch accordingly comprises the features of construction, combination of elements, and arrangement of parts which will be exemplified in the constructions described hereinafter, and the scope of the invention will be indicated in the claims.

DETAILED DESCRIPTION OF THE DRAWINGS

Figure 1:
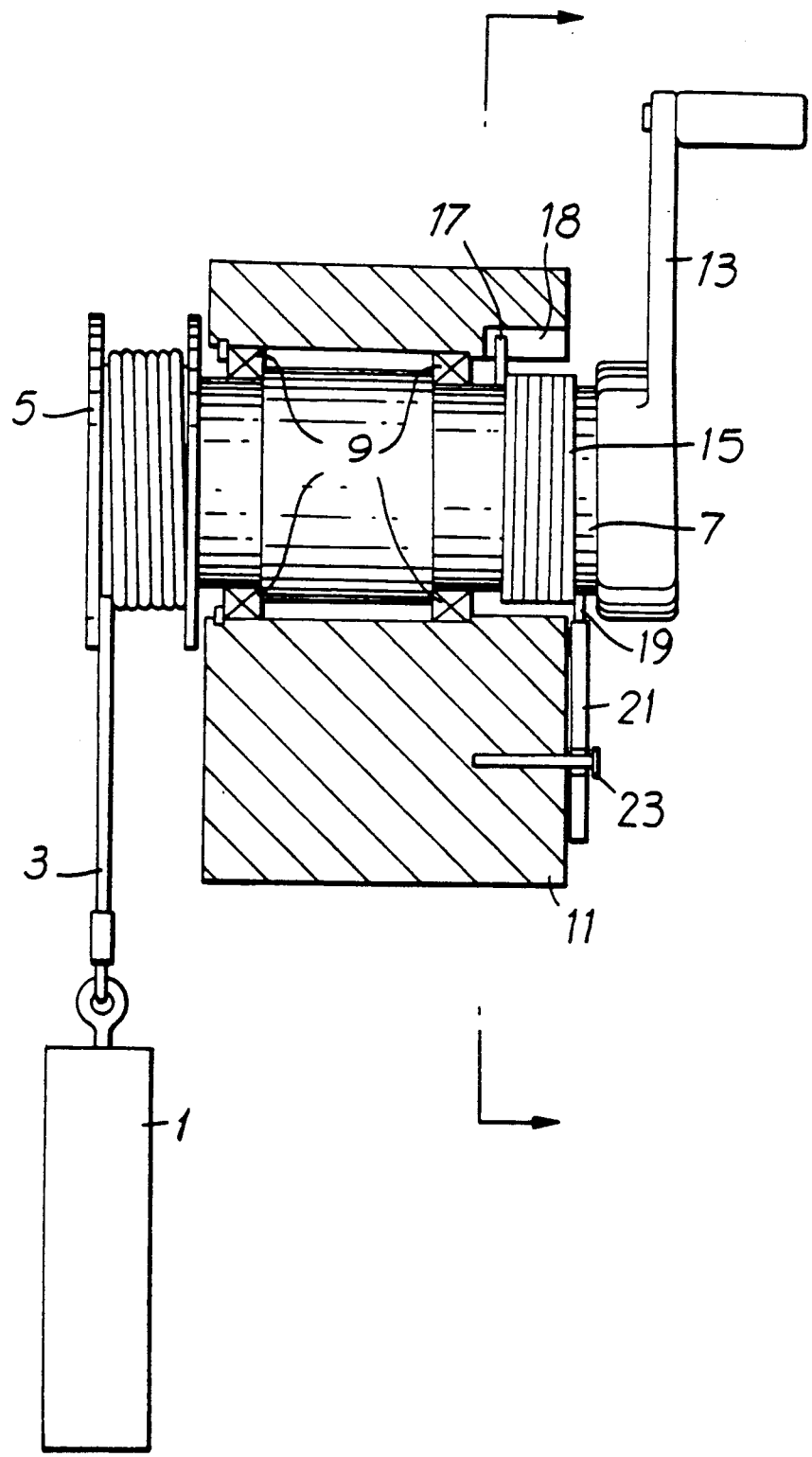
FIG. 1 is a cross-sectional side elevation view of a winch in which an overrunning spring clutch is used as a brake.

The winch shown in FIG. 1 is an example of a mechanism employing a spring clutch with which our invention can be beneficially employed. Weight 1 is supported by cable 3 which winds onto drum 5. Drum 5 is attached to core 7 which is rotatably mounted within bearings 9 which are retained in housing 11. Core 7 can be turned by crank 13 to raise weight 1. Spring 15, whose free diameter is slightly smaller than the diameter of core 7 has been expanded and disposed about core 7 prior to the attachment of crank 13. Tang 17 is formed at one end of spring 15 to fit into pocket 18 in housing 11. Release tang 19, which is formed at the other end of spring 15, can be contacted by release lever 21 which is mounted on pivot 23.

Figure 2:
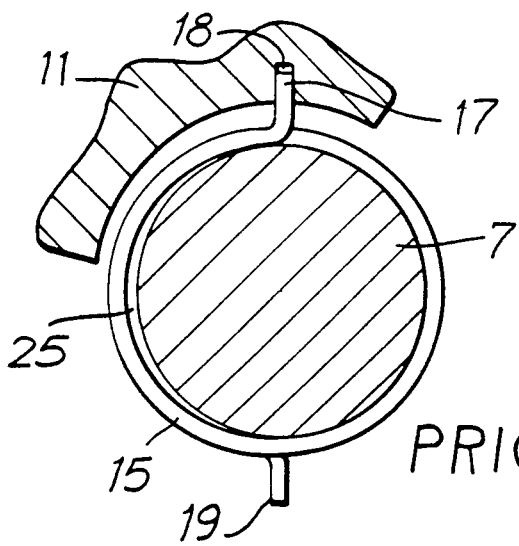
FIG. 2 is a view of the spring clutch used in FIG. 1, taken cross-sectionally through one tang of the clutch spring.

FIG. 2 is a cross-sectional view of the spring clutch depicted in the winch of FIG. 1. The cross-section is taken at the location of tang 17.

The operation of this winch will be very familiar to those skilled in the art of spring clutches. Core 7 can be rotated freely in the clockwise direction, as seen in FIG. 2, by crank 13. Spring 15 does not impede clockwise movement of core 7 because, as drum 7 rotates, pocket 18 exerts a force on tang 17 so as to loosen the grip of spring 15 on core 7 for clockwise motion. When weight 1 has been raised to a desired height and crank 13 is released, pocket 18 restrains tang 17 which tightens spring 15 about core 7. This holds drum 5 and weight 1 in position. Release lever 21 is used to lower weight 1 by imparting a force on release tang 19 in the direction to loosen the grip of spring 15 on core 7. Slight movement of tang 19 allows core 7 and drum 5 to move freely in the counterclockwise direction as seen in FIG. 2. This simple and very unsophisticated device to is used in the following technical discussion only as an easily understandable example of the principles of our invention which can be applied in many other spring clutch devices.

While the load, weight 1, is being raised, the torque that will cause spring 15 to slip about core 7 as it rotates is given by:

$$T = M(e^{-2uN} - 1)$$

in which:

M = the moment in the spring wire produced by expanding spring 15 to place it over core 7, u = the coefficient of friction between the spring and the core, and N = the number of turns of wire in the spring.

The relationship between M and the radius of the spring wire is given by:

$$M = EI\left(\frac{1}{R} - \frac{1}{R_o}\right)$$

in which:

E = The modulus of elasticity of the wire,

I = The moment of inertia of the wire, $R_o$ = The free inside diameter of the spring, and R = The radius of core 7.

A moment, equal to M, externally applied at the ends of the spring so as to oppose the moment in the wire, would expand spring 15, eliminating the normal force and, with it, any friction between the spring and the core. So long as the externally applied moment remained, the spring would rotate freely about the core. As pure couples are difficult to achieve in practice, this idealized method for releasing the spring from the core is impractical.

In actual practice, the slippage of the spring is usually produced by the application of a single external force such as is applied by pocket 18 to tang 17 in FIG. 1, rather than by a couple. In the analysis that follows, it is assumed that R, the radius of the core 7, is much larger than the thickness of the wire of spring 15, so that the force which is applied to tang 17 is approximately at a radial distance R from the center of core 7. This assumption is made because it simplifies the following mathematical explanation. An analysis that does not make this simplifying assumption, but uses precise values produces results that are qualitatively the same, however the actual values of the physical quantities such as forces and torques will have slightly different numerical values. These differences are not important for the understanding of the principles of our invention.

As core 7 is rotated, the force, herein called F, imposed by pocket 18 on tang 17, produces a moment in the spring which increases as the distance along the spring increases, reaching a maximum value of 2FR on the opposite side of core 7 from the point at which force F is applied. Horizontal equilibrium requires that, in addition to force F, there be an equal and opposite reaction force, $F_r$, exerted by the core on the spring. $F_r$ produces additional friction that must be overcome before the spring can slip. Since F is the total force needed to cause the wire to slip, the maximum moment produced by F, 2FR, must be the sum of: a) the moment needed to increase the free diameter of spring 15 to equal the diameter of core 7 plus b) the moment due to $F_r$. Thus, $$2FR = EI\left(\frac{1}{R} - \frac{1}{R_o}\right) + uF_r R$$

But, since $$M = EI\left(\frac{1}{R} - \frac{1}{R_o}\right)$$

then $$2FR = M + uF_r R$$

which is greater than M, so that the radius of curvature at the point, on the first turn of the spring, opposite tang 17, is greater than the radius of core 7. This means that spring 15 cannot make contact with core 7 until the point at which the moment has decreased to M. This point must be beyond the first half turn.

Referring again to FIG. 2, at the point of application of force F, the spring wire has a radius of curvature equal to $R_o$, its free radius. The wire's radius of curvature increases to a maximum value of 2FR at the point opposite the point of application of F. Because of this monotonic increase in the curvature, except at the point of application of F, the wire cannot contact the core anywhere within the first half turn, and beyond that until the point at which the moment has decreased to M. Thereafter, the moment remains constant throughout the length of the spring except for the distortion at the far end. This means that there is gap 25, as seen in FIG. 2, between spring 15 and core 7. Gap 25 has its maximum size slightly beyond a quarter of the first turn of the spring. The movement that produces the gap between the spring and the core is lost motion. In the device of FIG. 1, this lost motion will permit weight 1 to fall slightly each time the driving force is removed as clutch spring 15 tightens about core 7 to hold the load in position.

Our invention enables a substantial reduction in this component of lost motion. According to the principles of our invention, the gap between the spring and the core is largely eliminated by the addition of another element, an urging means, so positioned as to apply a radially inward force on the spring near the position of maximum separation. The urging means can be an additional element included specifically to apply the needed force, or it can be a surface added to an existing element for applying the requisite force. The preferred means is one that lightly contacts the spring to apply the restraining force even when the no gap is present.

The urging means should have a small preload but a high spring rate so that there is little effect on the operation of the spring when it is not being released, but immediate restraint without the development of a gap during release. A stiff but slippery elastomer or a separate spring with a low friction button have ideal mechanical characteristics for the restraint, but it is also possible to accomplish the restraint by placing a rigid stop or boss so as to keep the spring close to the core. In the case of a rigid stop or boss, it is important to insure that there is slight clearance between it and the spring when the spring is against the core. This clearance, of course, produces lost motion upon release, so this method, while simple to implement, has a more limited effect.

Figure 3:
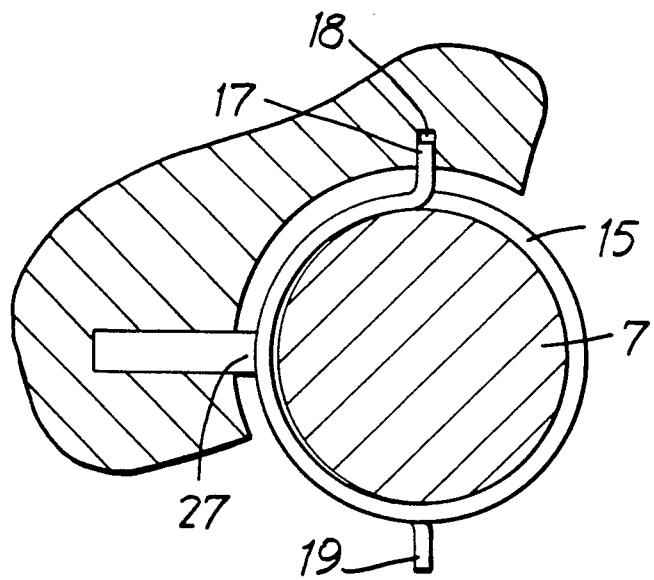
FIG. 3 is the same as FIG. 2 but with the addition of a boss for limiting lost motion.

FIG. 3 shows the same view of the clutch of FIG. 1 as is shown in FIG. 2 except that boss 27 has been added to limit the movement of spring 15 away from core 7. Any contact between housing 11 and the end of spring 15 near release tang 19 will prevent proper operation of the clutch.

Although it is possible to reduce the gap by surrounding the spring with a closely fitted coaxial sleeve, thereby preventing any unwanted expansion of the spring, the preferred method is to urge the spring toward the core only where necessary. One reason for using a local constraint is that added frictional drag due to extended contact with the sleeve would detract from proper operation of the device; and incidental contact near the unloaded end of a wrap spring can tend to release the spring. A second reason is that it is difficult and expensive to maintain such close tolerances as would be required to effectively reduce the lost motion merely by the elimination of clearances.

Figure 4:
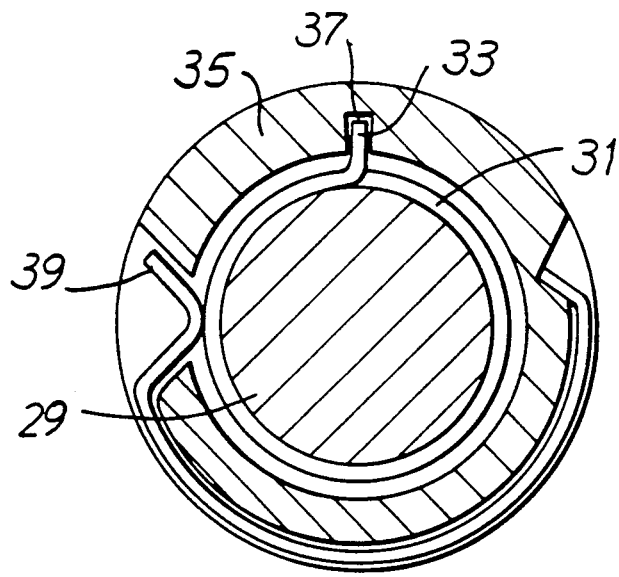
FIG. 4 is a cross-sectional view of an overrunning wrap spring clutch including a auxiliary spring for limiting lost motion.

Other embodiments of our invention employ the same principle in different mechanical arrangements that exhibit the same lost motion producing behavior. The overrunning clutch of FIG. 4 has rotatable core 29 about which spring 31 is disposed. Spring 31 has an end bent radially outward to form tang 33. Housing 35 is rotatably and coaxially mounted about core 29 and spring 31. Housing 35 has pocket 37 for engaging tang 33. Auxiliary spring 39 is configured to apply radially inward pressure to spring 31 at a point approximately 90 degrees from the end of spring 31. When core 29 is rotated in the clockwise direction as seen in FIG. 4, very little torque is applied to housing 35 by spring 31 because pocket 37 imparts to tang 33 of spring 31 a force which releases the frictional grip of spring 31 on core 29, permitting slippage. Auxiliary spring 39 prevents the formation of a large gap between spring 31 and core 29 during the release. Because there has been little lost motion during the release of spring 31, when the motion of core 29 is reversed, spring 31 will quickly grip core 29 and transfer that motion to housing 35 with a minimum of lost motion during the change in direction.

As mention above, for optimum performance, auxiliary spring 39 should have a very high spring rate, but only a small amount of preload when spring 31 is in contact with core 29. The preload causes additional friction between spring 31 and core 29 which increases the load at which spring 31 will slip about core 29 under load, but it also insures that the restraining force is applied as the spring tends to move away from the core. This permits the restraint to begin to operate before the formation of even a small gap.

Figure 5:
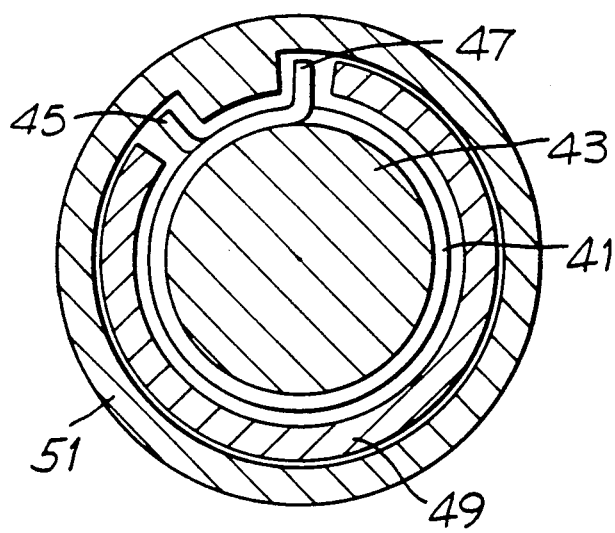
FIG. 5 is a cross-sectional view of a bi-directional wrap spring clutch.

Our invention can also be beneficially applied for the reduction of lost motion in a wrap spring clutch having an input, an output, and a control element for controlling the torque connection between the input and output elements. FIG. 5 is a cross-sectional view of a bidirectional version of such a clutch in which wrap spring 41 is disposed about core 43. Spring 41 has tangs 45 and 47 at its ends for control by control element 49 and housing 51. The operation of the device depicted in FIG. 5 is described in U.S. Pat. Nos. 4,372,432 and 4,433,765 and will be familiar to those skilled in the art. An undesirable effect of lost motion in the device of FIG. 5 can be seen in FIG. 6 which shows the same device but with control element 49 rotated until the control element contacts tang 47 and moved it into contact with key 53 of housing 51. The movement of tang 47 results in the formation of gap 55. The large excursion of tang 47 required to release the grip of the spring on core 43 brings key 53 also into contact with tang 45 before spring 41 is fully released, and this contact prevents the intended release. The prior art solution to this problem has been to space the tangs further apart, thereby increasing the lost motion of the clutch during reversal.

Figure 6:
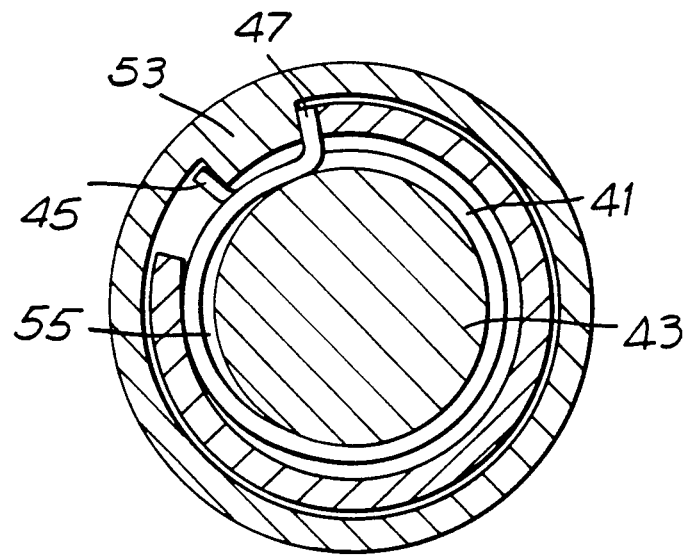
FIG. 6 shows the clutch of FIG. 5 with the control element and spring in a different position.
Figure 7:
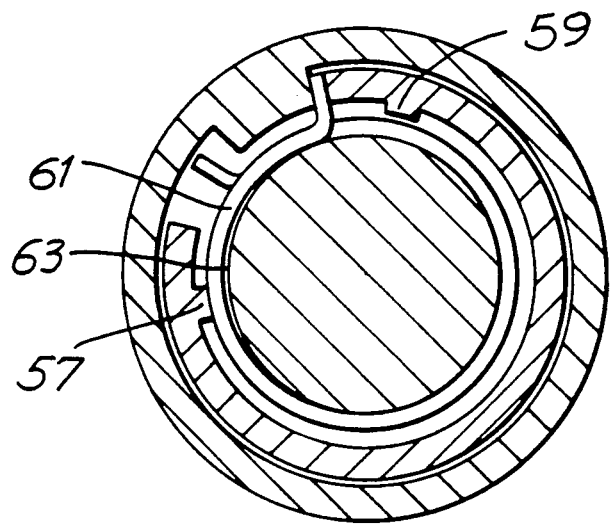
FIG. 7 shows a clutch similar to the clutch of FIGS. 5 and 6 into which our invention has been incorporated.

FIG. 7 is a cross-sectional view of a clutch of the same construction and dimensions as the clutch of FIGS. 5 and 6 to which bosses 57 and 59 have been added approximately one quarter of a revolution away from each tang. The bosses limit the size of the gap that can form during release by preventing radial movement of spring 61 in the same manner as did auxiliary spring 39 of the clutch of FIG. 4. In FIG. 7, main clutch spring 61 is shown contacting boss 57, which is limiting the size of gap 63. This permits the clutch to release properly without the necessity for increasing the spacing between spring tangs. The clutch can operate properly with much less backlash because of the addition of the bosses.

The use of a boss in place of an auxiliary spring is simpler in that the boss can be incorporated into the second shaft as a feature so that no additional parts are required. Use of a boss also avoids some of the extra drag that can occur in the clutch of FIG. 4 due to contact between the auxiliary spring and the main clutch spring. The boss requires some clearance between itself and the main clutch spring for proper operation of the clutch, and this will usually mean tolerating a little extra backlash as compared to the auxiliary spring method. The auxiliary spring method with high stiffness and low preload can eliminate the most backlash by being in contact with the main clutch spring and applying pressure even when there is no gap.

Figure 8:
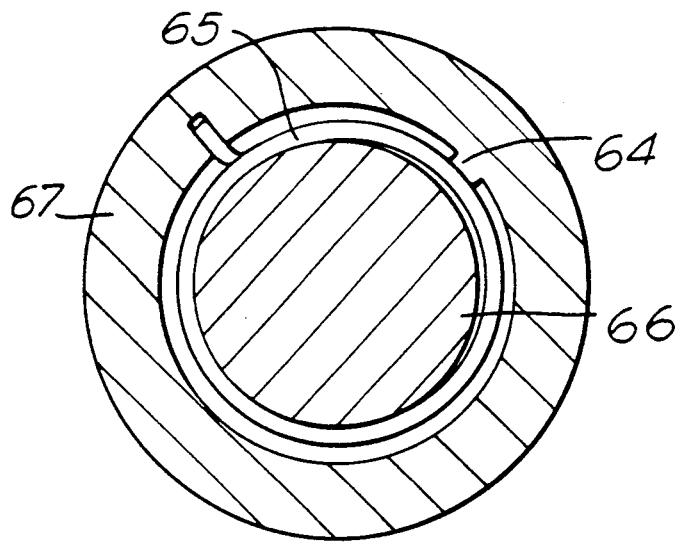
FIG. 8 depicts a clutch similar to the clutch of FIG. 4, but with a boss instead of an auxiliary spring.

The overrunning clutch of FIG. 8 has the same general operating characteristics as the clutch of FIG. 4, except that boss 64 has replaced auxiliary spring 39 of FIG. 4. In FIG. 8, spring 65 is disposed about core 66 and within housing 67. Boss 64 is formed as a part of housing 67 for urging spring 65 to remain close to core 66. Just as in the clutch of FIG. 4, the size of the gap that can be formed is limited, in this case by boss 64 instead of auxiliary spring 39. Here also, the gap is not as completely suppressed by the boss as it would be by an auxiliary spring, but it is a much simpler method to implement.

Figure 9:
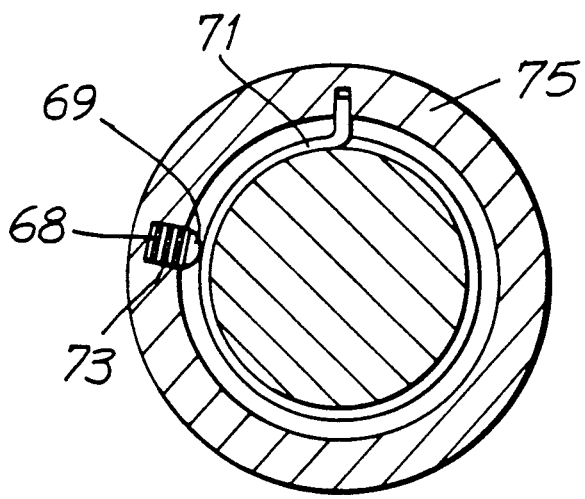
FIG. 9 depicts an alternative type of auxiliary spring.

FIG. 9 shows an alternative spring configuration for limiting gap formation that can be used in any of the previously depicted clutch configurations. Auxiliary spring 68 has button 69 at its end for contacting spring 71 to prevent a gap from forming during release of main clutch spring 71. The outer end of auxiliary spring 67 is properly positioned by providing pocket 73 in housing 75.

Figure 10:
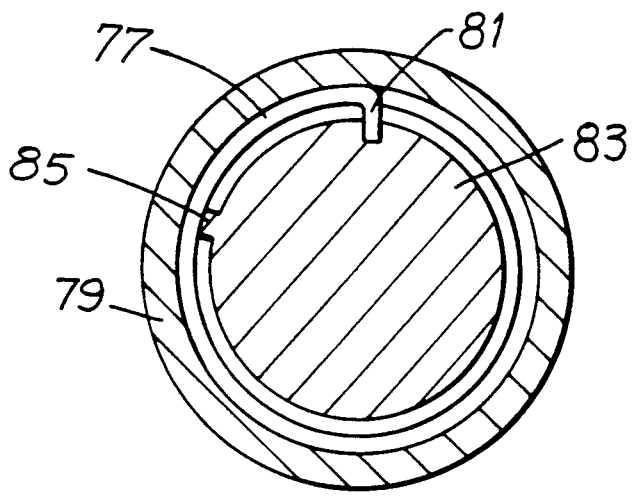
FIG. 10 is a cross-sectional view of an alternative embodiment of our invention in an overrunning clutch.

FIG. 10 shows, again in cross-sectional view, an alternative embodiment of our invention incorporated into an inside out version of an overrunning clutch. In this device, main clutch spring 77 grips the outside element, housing 79. The inside element, core 83 engages tang 81 of main clutch spring 77 to release the spring's grip on housing 79 in the overrunning direction and to tighten it against housing 79 in the other, torque transmitting, direction. In this embodiment, our invention employs boss 85 to prevent the formation of a substantial gap by the movement of main clutch spring 77 more than slightly away from housing 79. An auxiliary spring could be used in place of boss 85 in a manner analogous to the way auxiliary spring 39 is used in FIG. 4, or auxiliary spring 67 is used in FIG. 9.

It will thus be seen that the objects set forth above among those made apparent from the preceding description, are efficiently attained and, since certain changes may be made in the construction of the inventive spring clutch without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

We claim:

1. A spring clutch comprising:
   a shaft;
   a helically wound coaxially mounted spring for making frictional contact with the shaft;
   means for selectively applying a loosening force to at least one end of the spring for rotation thereof with respect to the shaft; and
   means for urging the spring toward the shaft when the spring is rotatably loosened for substantially preventing radial movement of the spring away from the shaft comprising means for bearing radially against a single location along said spring.

2. The spring clutch of claim 1, wherein said spring and said shaft define a gap therebetween and wherein said urging means is adapted to apply a force at said single location to the spring which force increases rapidly as the gap between the spring and the shaft increases.

3. The spring clutch of claim 2, wherein the shaft has an outer radial surface and the spring is disposed about said outer radial surface for making frictional contact with the shaft.

4. The spring clutch of claim 3, further comprising a housing coaxially mounted about said shaft, said spring being located between the shaft and the housing.

5. The spring clutch of claim 4, wherein the urging means is retained by the housing.

6. The spring clutch of claim 5, wherein the housing is rotatably mounted with respect to the shaft.

7. The spring clutch of claim 6, wherein the applying means is operated by relative rotational movement of the housing with respect to the shaft.

8. The spring clutch of claim 7, wherein the applying means comprises a tang element located at said at least one end of said spring.

9. The spring clutch of claim 8, wherein said tang element is operatively engaged by the housing during relative rotational movement of the housing with respect to the shaft.

10. The spring clutch of claim 8, wherein said tang element is disposed in a pocket formed in said housing.

11. The spring clutch of claim 5, wherein said urging means comprises a boss.

12. The spring clutch of claim 5, wherein the urging means comprises an auxiliary spring.

13. The spring clutch of claim 3, wherein the said urging means is located at about 90 degrees along the outer radial surface of said shaft from said at least one end of said spring.

14. The spring clutch of claim 2, wherein the shaft has an inner radial surface and said spring is disposed along said inner radial surface for making frictional contact with the shaft.

15. The spring clutch of claim 14, further comprising a core coaxially mounted within said shaft, said spring being located between the shaft and the core 16. The spring clutch of claim 15, wherein the urging means is retained by the core.

17. The spring clutch of claim 16, wherein said core is rotatably mounted with respect to the shaft.

18. The spring clutch of claim 17, wherein the applying means is operated by relative rotational movement of the core with respect to the shaft.

19. For spring clutch comprising a shaft and a helically wound coaxially mounted spring for making frictional contact with the shaft, a method for substantially eliminating any gap formed between the spring and the shaft when applying a force to at least one end of the spring to cause the rotation thereof with respect to the shaft, the method comprising the step of urging of the spring toward the shaft by bearing radially against a single location along the spring in order to substantially prevent radial movement of the spring away from the shaft.

20. For a spring clutch comprising a shaft and a helically wound coaxially mounted spring for making frictional contact with the shaft, a method for operating the spring clutch comprising;
   applying a loosening force to at least one end of the spring to cause the rotation thereof with respect to the shaft;
   urging the spring toward the shaft for substantially preventing radial movement of the spring away from the shaft when applying the loosening force; and
   applying a tightening force to said at least one end of the spring in order to tighten the spring about said shaft.

21. For a spring clutch comprising a shaft and a helically wound coaxially mounted spring for making frictional contact with the shaft, a method for operating the spring clutch comprising:
   applying a loosening force to at least one end of the spring to cause the rotation thereof with respect to the shaft;
   urging the spring toward the shaft by bearing radially against a single location along the spring in order to substantially prevent radial movement of the spring away from the shaft when applying loosening force; and
   applying a tightening force to set at least one end of the spring in order to tighten the spring about said shaft.

22. A spring clutch comprising a shaft, a helically wound coaxially mounted spring for making frictional contact with the shaft, means for selectively applying a loosening force to at least one end of the spring for rotation thereof with respect to the shaft, and means for urging the spring toward the shaft when the spring is rotatably loosened for substantially preventing radial movement of the spring away from the shaft.

* * * * *